United States Patent
Nakazawa et al.

(10) Patent No.: US 6,936,988 B2
(45) Date of Patent: Aug. 30, 2005

(54) POWER-WINDOW JAMMING PREVENTING APPARATUS

(75) Inventors: Yuichi Nakazawa, Haibara-gun (JP); Yasuyuki Mochizuki, Haibara-gun (JP); Susumu Yamamoto, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/930,961

(22) Filed: Sep. 1, 2004

(65) Prior Publication Data
US 2005/0067987 A1 Mar. 31, 2005

(30) Foreign Application Priority Data
Sep. 2, 2003 (JP) .................................. P. 2003-310485

(51) Int. Cl.$^7$ ................................................. H02P 3/00
(52) U.S. Cl. ....................... 318/469; 318/280; 318/283; 318/434; 318/466; 49/26; 49/28
(58) Field of Search ................................. 318/280–283, 318/286, 466, 468, 469, 434, 432; 49/26, 28

(56) References Cited

U.S. PATENT DOCUMENTS

| | | | | |
|---|---|---|---|---|
| 5,559,375 A | * | 9/1996 | Jo et al. ..................... 307/10.1 |
| 5,729,104 A | * | 3/1998 | Kamishima et al. ......... 318/446 |
| 5,734,245 A | * | 3/1998 | Terashima et al. .......... 318/453 |
| 5,977,732 A | * | 11/1999 | Matsumoto .................. 318/283 |
| 6,051,945 A | * | 4/2000 | Furukawa .................... 318/280 |
| 6,359,408 B1 | * | 3/2002 | Tyckowski .................. 318/469 |
| 6,548,979 B2 | * | 4/2003 | Boisvert et al. ............ 318/469 |
| 6,867,563 B2 | * | 3/2005 | Ohshima ..................... 318/434 |

FOREIGN PATENT DOCUMENTS

JP     2002-295129 A     10/2002

* cited by examiner

Primary Examiner—Rina Duda
(74) Attorney, Agent, or Firm—Sughrue Mion, PLLC (57) ABSTRACT

A power-window jamming preventing apparatus, includes a current sensing circuit, which senses a motor current flowing through a motor for driving a window glass; a current limiting circuit, which increases and decreases the motor current based on a current-limitation control signal outputted from the current sensing circuit when an amount of increase of the motor current exceeds a predetermined vale; a jamming determining circuit, which determines a jamming of a foreign matter in the window glass based on increase of the motor current to reverse a rotation of the motor; and a charge/discharge controlling circuit which monitors a voltage level of a charge/discharge controlling signal, and controls a charging/discharging circuit to keep a third reference voltage constant when the charge/discharge controlling signal having one of voltage levels is continuously outputted for a predetermined time.

3 Claims, 7 Drawing Sheets

POWER-WINDOW JAMMING PREVENTING APPARATUS

BACKGROUND OF THE INVENTION

The present invention relates to an apparatus for preventing a jamming of a foreign matter (e.g., finger, neck, or the like of the passenger) in a power window of a vehicle and, more particularly, improvement in a power-window jamming preventing apparatus for determining quickly a jamming of a foreign matter without error.

An apparatus for automatically opening/closing a window glass of a vehicle is normally called a power window, and is an apparatus that opens/closes the window glass by a motor. A power-window jamming preventing apparatus is employed to provide the jamming protection to the power window as the countermeasure to prevent the jamming of the foreign matter in the window glass. In the normal power-window jamming preventing apparatus, the load applied to the jammed foreign matter is extremely increased because of an increase of the motor current when the jamming of the foreign matter occurs during the lifting of the window glass, and therefore the motor current must be limited to suppress such increase of this motor current.

Therefore, the power-window jamming preventing apparatuss improved to take account of the above circumstances were proposed (for example, see JP-A-2002-295129).

In the description in the following drawings, the same or like symbols are affixed to the same or functionally like portions.

The power-window jamming preventing apparatus proposed in JP-A-2002-295129 will be explained in detail with reference to the accompanying drawings hereunder.

(Outline of the Power-Window Jamming Preventing Apparatus)

Figure 3:
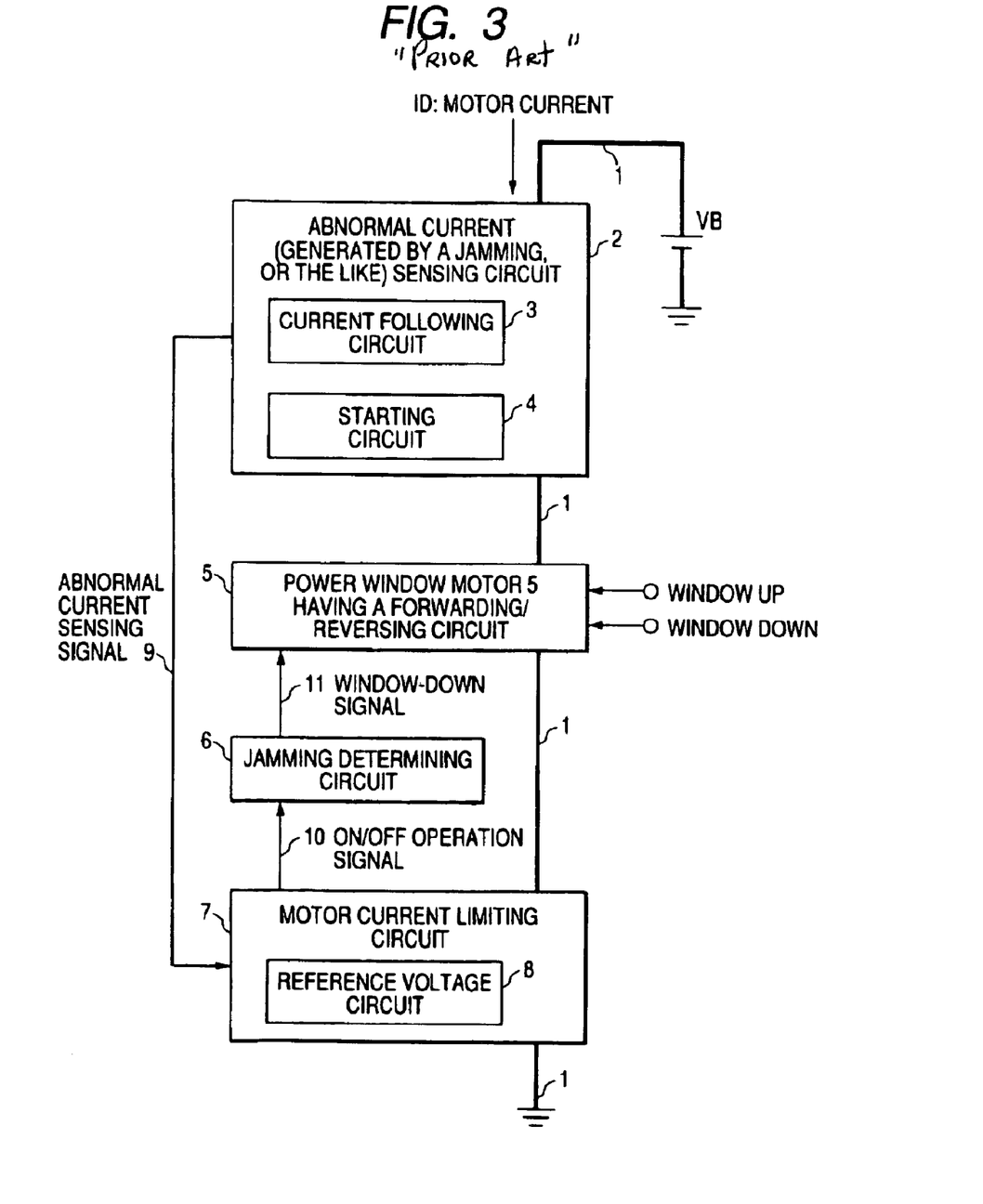
FIG. 3 is a block diagram of a power-window jamming preventing apparatus in the related art.

FIG. 3 is a block diagram of an example of the power-window jamming preventing apparatus proposed in JP-A-2002-295129. This power-window jamming preventing apparatus has an abnormal current (generated by a jamming, or the like) sensing circuit 2, a power window motor 5 having a forwarding/reversing circuit, a jamming determining circuit 6, and a motor current limiting circuit 7. In this case, the power window motor 5 having the forwarding/reversing circuit may be considered as the forwarding/reversing circuit 5 containing the power window motor. Three circuits of the current sensing circuit 2, the forwarding/reversing circuit 5, and the current limiting circuit 7 are connected in series with an electric wire 1 through which a motor current ID flows, and are connected to a power supply device VB.

(Out Line of the Abnormal Current (Generated by the Jamming, or the Like) Sensing Circuit 2)

The current sensing circuit 2 senses an abnormal current generated in the motor current ID by the jamming, or the like, and then outputs an abnormal current sensing signal (current-limitation control signal) to the current limiting circuit 7 via a signal line 9. The current sensing circuit 2 has a multi-source field effect transistor (FET) or a multi resistor, a current following circuit 3, and a starting circuit 4.

The multi-source FET is composed of a main FET and a reference FET. Also, the multi resistor is composed of a shunt resistor and a reference resistor. A current sensing ratio n of the multi-source FET or the multi resistor, i.e., a resistance component ratio of the reference resistor to the main resistor, for example, is set in excess of 1, preferably set to 100 or more. The motor current ID is supplied to the main FET or the shunt resistor. Then, a reference current Iref is controlled in such a manner that the reference current Iref that satisfies a condition of ID=n*Iref flows through the reference FET or the reference resistor.

In the case where the main FET or the shunt resistor is present on the high side of the motor (the power supply side with respect to the motor), a source potential of the main FET or a motor-side potential VSA of the shunt resistor and a source potential of the reference FET or a ground-side potential VSB of the reference resistor must be set to satisfy a condition of VSA=VSB so as to satisfy the above condition ID=n*Iref. If the motor current ID is changed owing to change in a driving force of the window glass when the motor is normally running, the source potential VSA of the main FET, etc. are also changed, but the condition of VSA=VSB is maintained by controlling the reference current Iref.

Next, a method of sensing the abnormal current generated by the jamming, or the like will be explained hereunder. The reference current Iref is classified into two current components each having a different following speed. The reference current Iref is classified into a current component Iref-s having a slow following speed and a current component Iref-f having a fast following speed. The current component Iref-s having a slow following speed is set such that such component follows the change in the motor current ID when the motor is normally running but cannot follow sudden change of the motor current ID when the jamming occurs. In contrast, the current component Iref-f having a fast following speed is set such that such component can follow not only change in the current when the jamming occurs but also a ripple component contained in the motor current ID. If the following characteristic of the current component Iref-f having a fast following speed is improved more and more, the current component Iref-s having a slow following speed is not needed to change and is stabilized. In order to satisfy such condition, the following speed of the current component Iref-f having a fast following speed is set 800 to 1000 times quicker than the current component Iref-s having a slow following speed.

When setting in this manner, the current component Iref-f having a fast following speed reflects exactly the change in the motor current ID except the ON/OFF operation of the semiconductor switching element. The change in the motor current ID is converted into a voltage by passing the current component Iref-f having a fast following speed through a resistor having a resistance value larger than the reference resistor. An amplified variation of an infinitesimal variation obtained by converting the change in the motor current ID into a voltage via an ON resistance of the shunt resistor or the main FET can be sensed by the conversion of this voltage.

When the jamming occurs, the current component Iref-f having a fast following speed is increased to follow the motor current ID, while the current component Iref-s having a slow following speed is seldom changed. As a result, a difference is generated between an average value of the current component Iref-f having a fast following speed and the current component Iref-s having a slow following speed, and thus a magnitude relationship of (average value of Iref-f)>(Iref-s) is derived. If this magnitude difference exceeds a previously set value, the abnormal current sensing signal is generated and then the multi-source FET placed on the high side of the motor or the semiconductor switching element (the FET or the bipolar transistor) in the current limiting circuit 7 placed on the low side of the motor is turned off.

Then, the multi-source FET or the semiconductor switching element placed on the low side of the motor execute the operation to repeat the ON/OFF operation and the continuous ON operation during when the jamming occurs.

Although explained in detail hereunder, the increase of the motor current ID can be limited by the operation to repeat the ON/OFF operation and the continuous ON operation.

(Outline of the Motor Current Limiting Circuit 7)

The current limiting circuit 7, when receives the abnormal current sensing signal, limits the current not to increase the motor current ID. This limitation is executed by causing the multi-source FET or the semiconductor switching element placed on the low side of the motor to repeat alternately the ON/OFF operation and the continuous ON operation. The operation signal to repeat the ON/OFF operation and the continuous ON operation is output to the jamming determining circuit 6 via a signal line 10. The current limiting circuit 7 has the semiconductor switching element such as FET, or the like for ON/OFF-controlling the motor current ID, and a reference voltage circuit 8 for generating an ON reference voltage and an OFF reference voltage of the semiconductor switching element.

When the motor current ID enters into the repeating operation of the ON/OFF operation and the continuous ON operation, such motor current ID is limited to keep an average value at a value that is slightly larger than a value obtained immediately before the jamming occurs. A motor torque is in proportion to the motor current, and accordingly the motor torque is kept at a torque that is slightly larger than a torque required for the drive of the window glass. If such required minimum torque is ensured, the minimum jamming load can be realized under the condition that the false reversion is not caused even though a glass driving force is momentarily varied due to the rough road, or the like.

(Outline of the Jamming Determining Circuit 6)

The jamming determining circuit 6 determines whether or not the jamming occurred, based on the input operation signal to repeat the ON/OFF operation and the continuous ON operation. The jamming determining circuit 6, when determines that the jamming occurred, outputs a window-down signal to the effect that the window glass is opened to the forwarding/reversing circuit 5 via a signal line 11.

In the determination of the jamming, such an event is utilized that a period of the ON/OFF operation of the semiconductor switching element is prolonged and a period of the continuous ON operation of the semiconductor switching element is shortened while the number of revolution of the motor is lowered owing to the jamming. For example, when the period of the ON/OFF operation comes up to a predetermined length, it is decided that the jamming occurred. When the occurrence of the jamming is determined, the motor 5 is stopped by shutting off the multi-source FET or the semiconductor switching element, and then the motor 5 is reversed/driven after a predetermined time lapsed. Accordingly, the window glass is opened and the inserted foreign matter can be prevented from being jammed.

(Outline of the Power-Window Motor 5 Having the Forwarding/Reversing Circuit)

The forwarding/reversing circuit 5 runs the motor in the direction to close the window glass by inputting a window-up signal, and runs the motor in the direction to open the window glass by inputting a window-down signal. Also, the forwarding/reversing circuit 5, when receives the window-down signal via the signal line 11, inverts the revolution of the motor from the direction to close the window glass to the direction to open the window glass. The forwarding/reversing circuit 5 has an H-bridge circuit or a relay circuit. When the H-bridge circuit is used, four FETs to constitute or connect the H-bridge circuit are used. The current sensing circuit 2 and the current limiting circuit 7 may be constructed by using the transistor on the high side out of four FETs, or the current sensing circuit 2 may be constructed by using the transistor on the high side and the current limiting circuit 7 may be constructed by using the transistor on the low side.

Figure 4A:
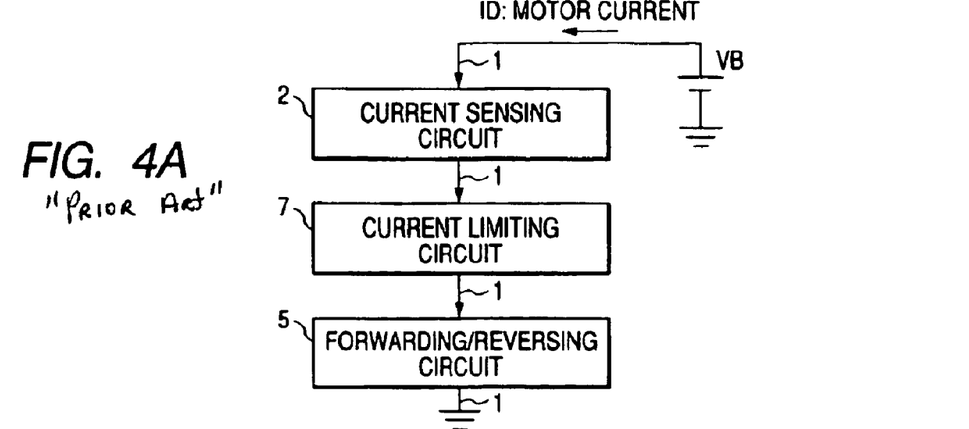
FIGS. 4A to 4C are block diagram explaining a variation of the power-window jamming preventing apparatus in the related art.
Figure 4B:
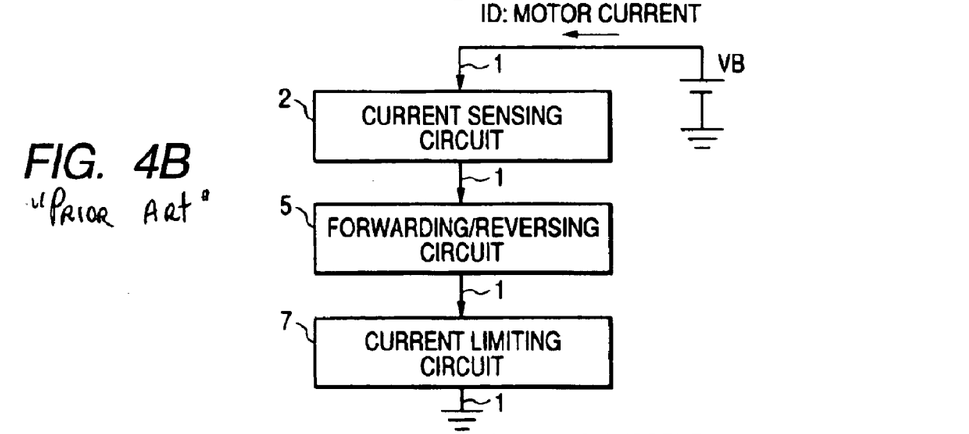
Figure 4C:
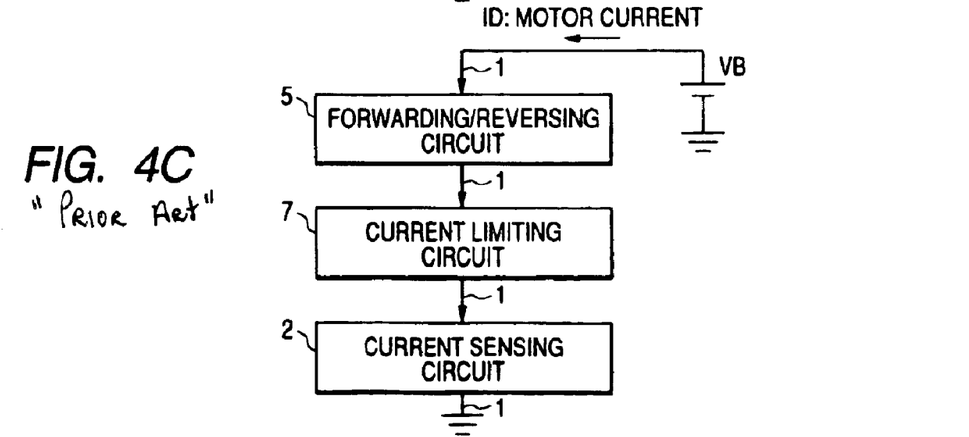

FIGS. 4A to 4C show a variation of a block diagram of the power-window jamming preventing apparatus. More particularly, the current sensing circuit 2 is connected to a plus terminal of the power supply device VB or a ground that is equivalent to a minus terminal, and the sequence in which the motor current ID is supplied to the forwarding/reversing circuit 5 and the current limiting circuit 7 may be set arbitrarily. More particularly, the sequence like the current sensing circuit 2→the current limiting circuit 7→the forwarding/reversing circuit 5, as shown in FIG. 4A, the sequence like the current sensing circuit 2→the forwarding/reversing circuit 5→the current limiting circuit 7 (i.e., the same sequence as shown in FIG. 3), as shown in FIG. 4B, the sequence like the forwarding/reversing circuit 5→the current limiting circuit 7→the current sensing circuit 2, as shown in FIG. 4C, and others may be selected. It may be concluded that no large difference of the action and the effect of the power-window jamming preventing apparatus is caused because of the difference of the sequence.

Figure 5:
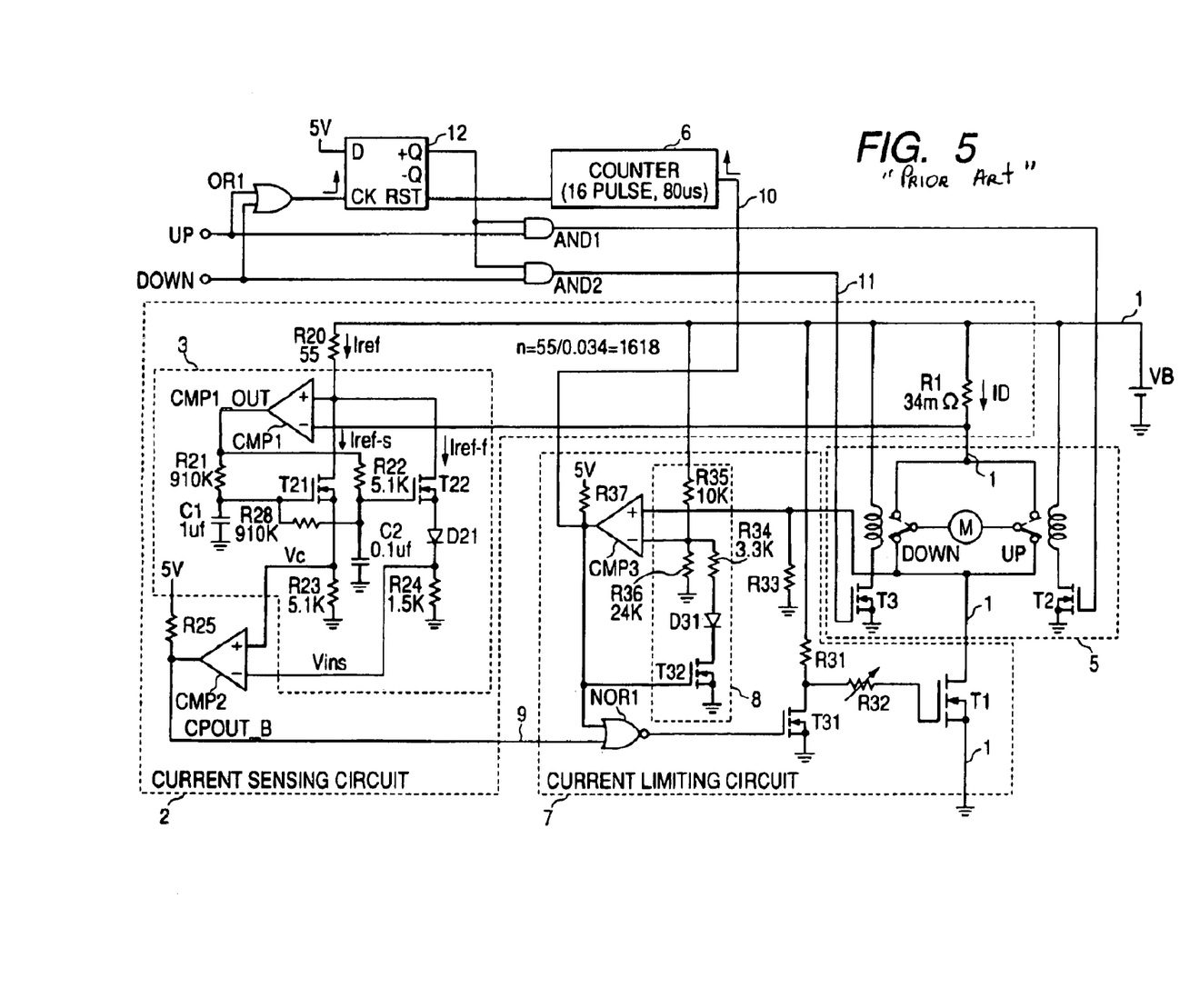
FIG. 5 is a circuit diagram of the power-window jamming preventing apparatus in the related art.

FIG. 5 shows an example of a circuit diagram of the power-window jamming preventing apparatus. The circuit configurations and the circuit operations of the current sensing circuit 2, the current limiting circuit 7, and the jamming determining circuit 6 in the power-window jamming preventing apparatus will be explained in detail herein.

1. Explanation of the Current Sensing Circuit 2

1-1. Circuit Configuration of the Current Sensing Circuit 2

A circuit for classifying the reference current Iref into two current components Iref-s and Iref-f each having the different following speed by using the shunt resistor and the reference resistor to sense the abnormal current will be explained hereunder.

The current sensing circuit 2 in FIG. 5 has a shunt resistor R1 and a reference resistor R20 both connected to the plus terminal of the power supply device VB, a current following circuit 3 connected to the resistors R1 and R20, a comparator CMP2 whose plus input terminal and minus input terminal are connected to the current following circuit 3 and whose output terminal is connected to the current limiting circuit 7, and a resistor R25 connected between a 5V power supply and the output terminal of CMP2.

The current following circuit 3 has a comparator CMP1 whose plus input terminal is connected to the reference resistor R20 and whose minus input terminal is connected to the shunt resistor R1, a first charging/discharging circuit constructed by connecting a resistor R21 and a grounded capacitor C1 in series and connected to an output terminal of CMP1, a second charging/discharging circuit constructed by connecting a resistor R22 and a grounded capacitor C2 in series and connected to the output terminal of CMP1, a resistor R28 connected between the capacitors C1 and C2, an nMOSFET (T21) whose drain terminal is connected to the plus input terminal of CMP1 and whose gate terminal is connected to the capacitor C1, a first source follower circuit constructed by a resistor R23 whose one end is connected to a source terminal of FET (T21) and the plus input terminal of CMP 2 and whose the other end is grounded, an nMOSFET (T22) whose drain terminal is connected to the plus input terminal of CMP1 and whose gate terminal is connected to the capacitor C1, a diode D21 whose anode terminal is connected to a source terminal of FET (T22), and a second source follower circuit constructed by a resistor R24 whose one end is connected to a cathode terminal of the diode D21 and the minus input terminal of CMP 2 and whose the other end is grounded.

In this case, 910K labeled to the resistor R21, etc. in FIG. 5 denotes that a resistance value of the resistor R21 is 910

KΩ. Similarly, 0.1 uf labeled to the capacitor C2, etc. denotes that a capacitance value of the capacitor C2 is 0.1 μF.

1-2. Explanation of an Operation of the Current Sensing Circuit 2

In FIG. 5, the shunt resistor R1, the forwarding/reversing circuit 5, and a semiconductor switching element (FET) T1 used to execute the ON/OFF operation are connected in series with the electric wire 1, through which the motor current ID flows, and connected between the plus terminal and the minus terminal of the power supply device (e.g., battery) VB. Forwarding/reversing relays in the forwarding/reversing circuit 5 are driven by transistors T2 and T3 respectively, and T2 is turned ON in the forwarding (up) operation while T3 is turned ON in the reversing (down) operation. The multi resistor is composed of the shunt resistor R1 and the reference resistor R20. In the circuit example in FIG. 5, a resistance value of R1 is set to 34 mΩ, and a resistance value of R20 is set to 55 Ω. The motor current ID flows through the shunt resistor R1 and the reference current Iref flows through the reference resistor R20. For convenience of explanation, the resistance value of the resistor R1, the capacitance value of the capacitor C2, and others are represented by the same symbol R1 as the resistor R1, and others. Thus, the current ratio n to satisfy the condition of R1*ID=R20*Iref is given by Eq.(1).

$$n=ID/Iref=R20/R1=55/0.034=1618 \quad \text{Eq.(1)}$$

The comparator CMP1 consists of an OP amplifier, and a motor-side potential of the shunt resistor R1 is input into the minus input terminal of CMP1 and a ground-side potential of the reference resistor R20 is input into the plus input terminal of CMP1. The first charging/discharging circuit constructed by connecting the resistor R21 and the capacitor C1 in series is connected to between the output of CMP1 and a ground potential level (GND), and the capacitor C1 is charged/discharged by an output (charge/discharge control signal CMP1_OUT) of CMP1 via the resistor R21. The non-grounded side of the capacitor C1 is connected to the gate terminal of FET T21, the drain terminal of FET T21 is connected to the reference resistor R20, and the source terminal of FET T21 is grounded via the resistor R23. Since FET T21 and the resistor R20 constitute the first source follower circuit, a current that is proportional to a potential of the capacitor C1 flows through FET T21 and the resistor R20. This current serves as the current component Iref-s having a slow following speed in the reference current Iref. In contrast, the second charging/discharging circuit constructed by connecting the resistor R22 and the capacitor C2 in series is connected to between the output of CMP1 and the ground potential level (GND), and the capacitor C2 is charged/discharged by the output of CMP1 via the resistor R22. The non-grounded side of the capacitor C2 is connected to the gate terminal of FET T22, the drain terminal of FET T22 is connected to the reference resistor R20, and the source terminal of FET T22 is grounded via the resistor R24. Since FET T22, the diode D21, and the resistor R24 constitute the second source follower circuit, a current that is proportional to a potential of the capacitor C2 flows through FET T22, the diode D21, and the resistor R24. This current serves as the current component Iref-f having a fast following speed in the reference current Iref. The non-grounded sides of the capacitors C1 and C2 are connected via the resistor R28, so that potentials of the capacitors C1 and C2 are made equal to each other when the motor current ID is not changed. In other words, two charging/discharging circuits consisting of the capacitors C1, C2 and the resistors R21, R22 are connected in parallel to the output of the comparator CMP1, and two source follower circuits that flow the current in proportion to the potentials of respective capacitors C1 and C2 are connected in parallel between the reference resistor R20 and the ground. A time constant of the first charging/discharging circuit is set larger than that of the second charging/discharging circuit. In this circuit example, the time constant of the first charging/discharging circuit is given by Eq.(2) and the time constant of the second charging/discharging circuit is given by Eq.(3), and thus a ratio of time constants becomes 1:894.

$$\begin{aligned}\text{(Time constant of the first charging/discharging circuit)} =& \quad \text{Eq. (2)}\\ R21*(R22+R28)/(R21+R22+R28)*C1 = 910\,K* \\ (5.1K+910K)/(910K+5.1K+910K)*1\mu f = 456\text{ ms}\end{aligned}$$

$$\begin{aligned}\text{(Time constant of the second charging/discharging circuit)} =& \quad \text{Eq. (3)}\\ R22*C2 = 5.1K*0.1\ \mu f = 0.51\text{ ms}\end{aligned}$$

The jamming is sensed by the comparator CMP2. A source potential of T21 is input into the plus input terminal of CMP2 and a potential that is lower than the source potential of T22 by a forward voltage drop of about 0.7 V in the diode D21 is input into the minus input terminal. Because gate-source potentials of T21 and T22 are almost equal to each other, an amount of the voltage drop in D21 corresponds to a sensed value of the abnormal current that is increased due to the jamming. The current component Iref-f is increased because of the occurrence of the jamming, an output (current-limitation control signal CPOUT_B) of CMP2 is changed from an H level to an L level. Then, an output of a NOR1 in the current limiting circuit 7 is shifted to an H level, a transistor T31 is turned ON, and the transistor T1 as the semiconductor switching element is turned OFF. The abnormal current generated due to the jamming at this time is sensed as follows.

(a) First, the reference current Iref is separated into the current component Iref-s having a slow following speed the current component Iref-f having a fast following speed, as shown in FIG. 5. The change of the motor current ID appears in the Iref-f to contain the ripple component, and is reflected exactly in a source potential of T22, i.e., a voltage (Vins) at the minus input terminal of CMP2. As a result, a source potential of T21 on the Iref-s side, i.e., a voltage (Vc) at the plus input terminal of CMP2 is not subjected to the influence of a fast variation of the motor current ID, and reflects only an average value taken over a long period. Therefore, the above potential is kept at an almost constant potential while the current limitation is being carried out after the jamming occurred, whereby the ideal reference voltage can be realized.

(b) A variation component caused by the ripple component of the motor current is contained in the current component Iref-f having a fast following speed. Assume that an amplitude of the ripple current is ΔID-rip and the ripple component of the Iref-f is ΔIref-f-rip, ΔIref-f-rip=ΔID-rip/n is satisfied. In the case where R24=1.5KΩ and ΔID-rip=0.5 A, a voltage variation ΔVrip generated in the resistor R24 by ΔIref-f-rip becomes 0.46 V, as given by Eq.(4).

$$\begin{aligned}\Delta Vrip &= \Delta\ Iref\text{-}f\text{-}rip*R24 \quad &\text{Eq. (4)}\\ &= \Delta\ ID\text{-}rip/n*R24 = 0.5A/1618*1.5\ K\\ &= 0.46\ V\end{aligned}$$

That is, the voltage at the minus input terminal of CMP2 is oscillated by the ripple component at an amplitude ±0.23V (±ΔVrip/2). Therefore, the output of CMP2 is inverted from the H level to the L level when the average value of the Iref-f is increased by 0.47V (=0.7V−0.23V).

This 0.47V is calculated as 0.51 A (=0.47V/R24*n= 0.47V/1.5K*1618) in terms of the motor current ID. That is, in the circuit example in FIG. 5, when the average value of the motor ID is increased by 0.51 A due to the jamming, the output of CMP2 is shifted to the L level and then T31 is turned ON and T1 goes to its OFF state.

Figure 6A:
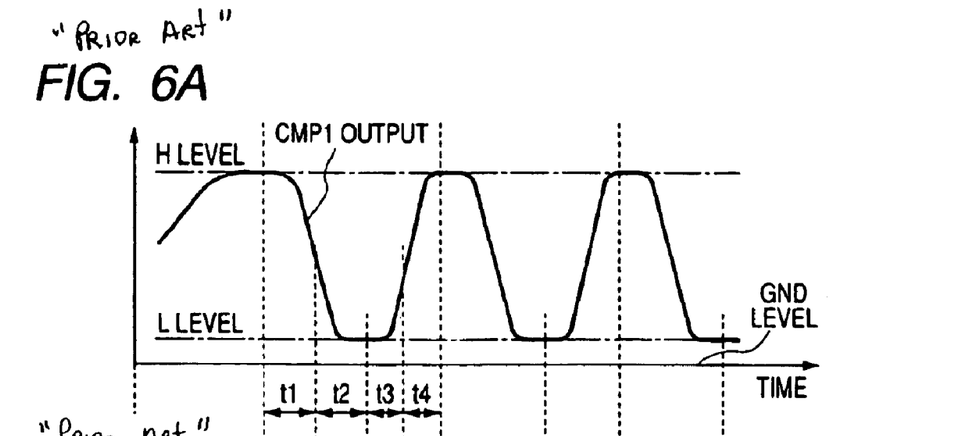
FIGS. 6A to 6C are views explaining an ON/OFF operation of a current sensing circuit in the power-window jamming preventing apparatus in the related art.
Figure 6B:
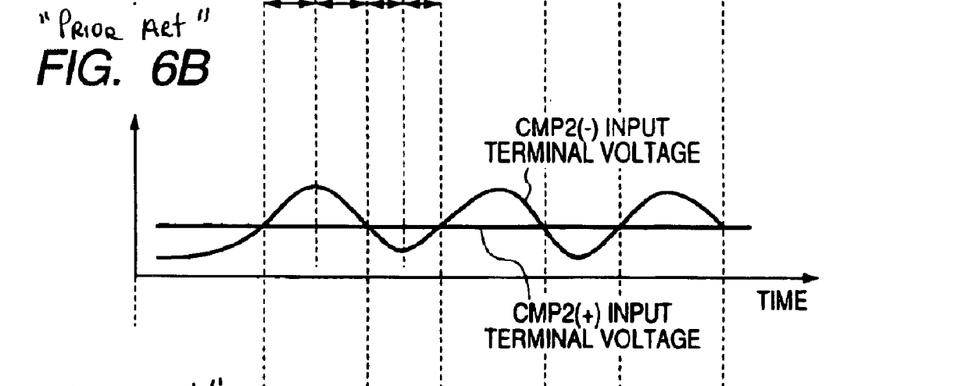
Figure 6C:
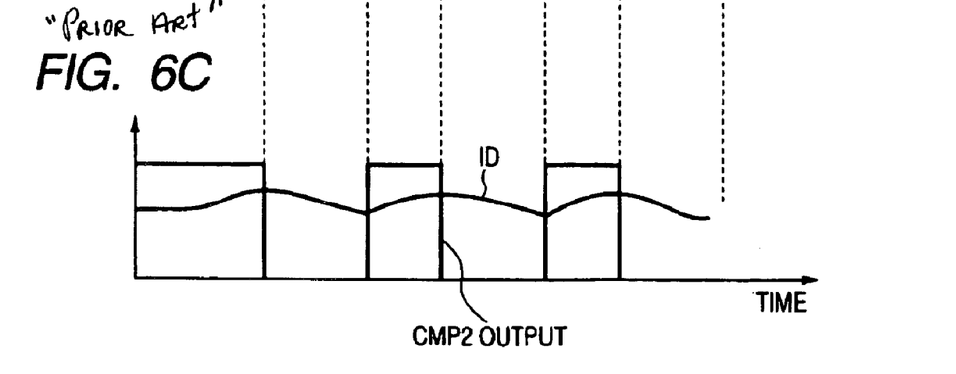

(c) As shown in FIGS. 6A to 6C, since the motor current is increased before the output of CMP2 is inverted into the L level (prior to a time t1), the output of CMP2 is at the H level. When T31 is turned ON, the motor current ID start to decrease with delay corresponding to a time during when the charges that are excessively charged in the gate of T1 are discharged. The output of CMP1 starts to shift from the H level to the L level at this point of time. However, since CMP1 is composed of the OP amplifier, a delay time is generated owing to the delayed response of the OP amplifier when such output is changed from the H level to the L level.

Since C2 is charged during a time t1 required until the output of CMP1 is lowered from the H level and becomes equal to the potential of the capacitor C2 after the output of CMP2 is inverted to the L level, the Iref-f is increased and the voltage at the minus input terminal of CMP2 is increased. Then, C2 starts to discharge when the output of CMP1 becomes lower than the potential of C2. The voltage at the minus input terminal of CMP2 goes back to the original voltage, i.e., the voltage at which the output of CMP2 is started to shift from the H level to the L level, after a time t2 required until the discharging of the charges stored for the time t1 is completed. The voltage at the plus input terminal is not changed during this time.

After the time t2 lapsed, the output of CMP2 is inverted to the H level and also FET T1 is turned ON. That is, the output of CMP2 is kept at the L level for a time t1+t2 after the motor current ID is increased and then the output of CMP2 is inverted to the L level. If the potential of C2 is located between the H level and the L level of the output of CMP1, a relationship of t1≈t2 is derived. The time t1+t2 is decided dependent upon a turn-OFF delay time of T1, a response speed of the OP amplifier, and a decreasing rate of the motor current ID. In this case, because the turn-OFF delay time of T1 and the response speed of the OP amplifier are constant, such time t1+t2 depends on the decreasing rate of the motor current ID and becomes longer as the decreasing rate becomes slower.

When the output of CMP2 is shifter again from the L level to the H level and also T1 is turned ON, the motor current ID starts to increase. Therefore, the output of CMP1 goes from the L level to the H level, but C2 is continued to discharge during when the output of CMP1 is lower than the potential of C2. Suppose that a time required until the output of CMP1 becomes equal to the potential of the capacitor C2 after the output of CMP2 is inverted to the H level is a time t3. When the output of CMP1 exceeds the potential of the capacitor C2, such capacitor C2 is started to charge. When a time t4 required until the charge having the same charge quantity as that being discharged for the time t3 is charged lapsed, the output of CMP2 is inverted to the L level and the T1 is turned OFF. In other words, the output of CMP2 is maintained at the H level for the time t3+t4. The time t3+t4 is decided based on the response speed of the OP amplifier and an increasing rate of the motor current ID. Because the response speed of the OP amplifier is constant, the time t3+t4 depends on the increasing rate of the motor current ID and is shortened smaller as the increasing rate is accelerated.

(d) The reason why the forward voltage drop of the diode D21 is used to set a jamming sensing value is to keep the jamming sensing value constant even though the motor current ID is changed and thus the average value of the Iref-f is changed. However, since the forward voltage drop of the diode D21 cannot be changed by this method when the jamming sensing value must be changed, such jamming sensing value is changed by adjusting a resistance value of the resistor R24. As understood from the explanation in the item (b), the jamming sensing value becomes small if the value of the resistor R24 is increased whereas the jamming sensing value becomes large if the value of the resistor R24 is decreased conversely.

(e) It is feasible to set the jamming sensing value by using a resistor in place of the diode D21. In this case, when the motor current ID is increased, the jamming sensing value is increased in proportion to this.

2. Explanation of the Current Limiting Circuit 7

2-1. Circuit Configuration of the Current Limiting Circuit 7

The current limiting circuit 7 in FIG. 5 includes a NOR gate NOR1 whose input terminal is connected to the output terminal of CMP2, a comparator CMP3 whose output terminal is connected to the input terminal of NOR1, the reference voltage circuit 8 connected to a minus input terminal of CMP3, the semiconductor switching element T1 whose drain terminal is connected to a plus input terminal of CMP3 and whose source terminal is grounded, a variable resistor R32 connected to a gate terminal of the switching element T1, an FET (T31) whose gate terminal is connected to an output terminal of NOR1, whose drain terminal is connected to the resistor R32, and whose source terminal is grounded, a resistor R31 connected between the plus terminal of the power supply device VB and the drain terminal, a resistor R33 connected between the plus input terminal of CMP3 and the ground, and a resistor R37 connected between the output terminal of CMP3 and the 5V power supply.

The reference voltage circuit 8 has a resistor R35 connected between the minus input terminal of CMP3 and the power supply device VB, a resistor R36 connected between the minus input terminal of CMP3 and the ground, a resistor R34 connected to the minus input terminal of CMP3, a diode D31 whose anode terminal is connected to the resistor R34, and an FET (T32) whose drain terminal is connected to a cathode terminal of the diode D31, whose source terminal is grounded, and whose gate terminal is connected to the output terminal of CMP3.

2-2. Explanation of an Operation of the Current Limiting Circuit 7

The limitation of the motor current ID is carried out by using the current sensing circuit 2 and the current limiting circuit 7 in combination.

At first, the operation of the current limiting circuit 7 will be explained hereunder. When an output of the comparator CMP2 in the current sensing circuit 2 is at the H level, an output of the NOR gate NOR1 becomes the L level, the transistor T31 is turned OFF, and the switching element (transistor) T1 is turned ON. Explanation will be made of the case where T1 is formed of FET. At this time, since the voltage at the plus input terminal of the comparator CMP3 is connected to the drain terminal of T1, the almost ground potential level is input to the terminal. In contrast, the voltage at the minus input terminal of the comparator CMP3 is decided by the reference voltage circuit 8 that consists of R34, R35, R36, the diode D31, and the transistor T32. When R34=3.3KΩ, R35=10KΩ, R36=24KΩ are set and the power supply voltage VB is set to 12.5V, such voltage becomes 8.82V if T32 is turned OFF while such voltage becomes 3.03V if T32 is turned ON. Since the voltage is never lowered smaller than 3.03V in any case, the output of CMP3 is at the L level. Thus, T32 is in its OFF state. When the jamming occurs and the output of the comparator CMP2 goes to the L level, the output of NOR1 goes to the H level, the T31 is turned ON, and the T1 is turned OFF. The drain voltage VDS of the T1 starts to increase from the ground potential level. Since T32 was turned OFF, the voltage at the minus input terminal of the CMP3 is 8.82V. When the drain voltage VDS of T1 goes to 8.82V or more, the output of CMP3 is inverted into the H level, the output of NOR1 goes to the L level, and T31 is turned OFF and T1 is turned ON.

At this time, since T32 is also turned ON at the same time, the minus input voltage of CMP3 is lowered to 3.03V. As a result, T1 holds its ON state until the drain voltage VDS is lowered to 3.03V or less once T1 is turned ON. When the drain voltage VDS of T1 is reduced lower than 3.03V, the output of CMP3 goes to the L level once again, T1 is turned OFF and simultaneously T32 is turned OFF, and the minus input terminal of CMP3 is increased up to 8.82V. T1 maintains its OFF state until the drain voltage VDS of T1 exceeds 8.82V. This operation corresponds to one period of the ON/OFF operation, and this state is continued inasmuch as the output of CMP2 is at the L level.

Constancy of the Motor Current in the ON/OFF Operation

Figure 7:
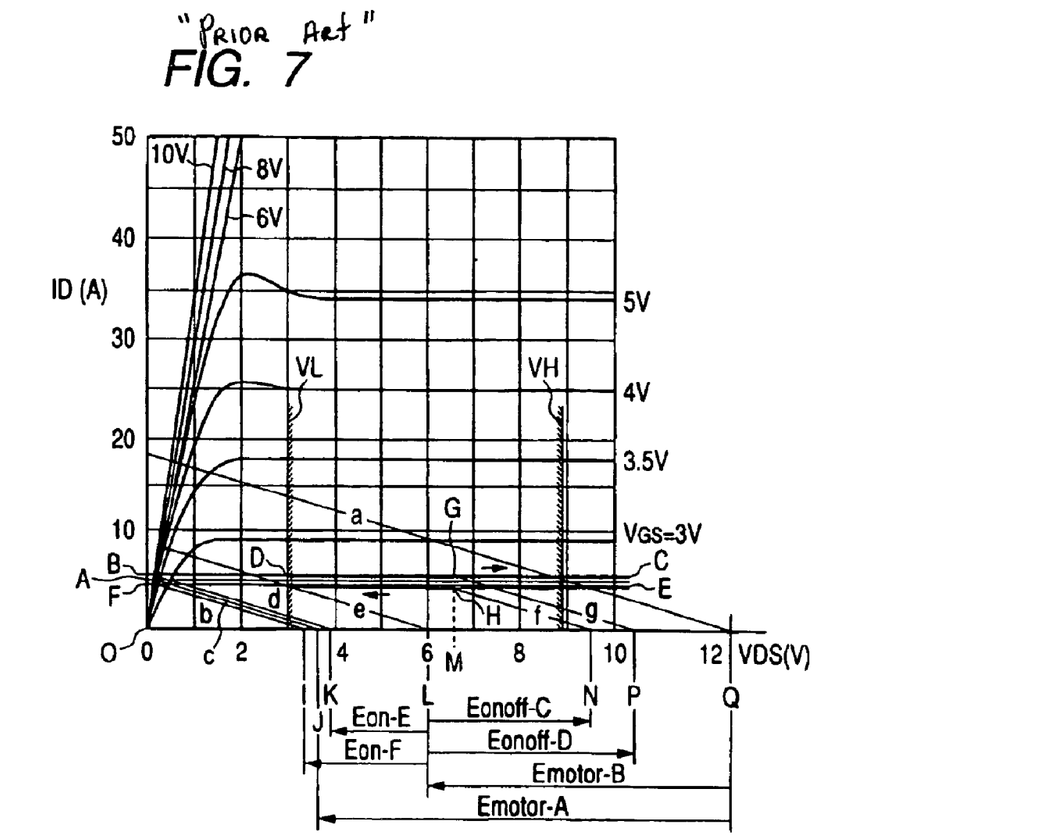
FIG. 7 is a static characteristic curve view explaining an operation of a semiconductor switching element in a current limiting circuit in the power-window jamming preventing apparatus in the related art, into which a load line is added.

Next, the event that the motor current ID is scarcely changed in one period of the ON/OFF operation when the ON/OFF operation is executed will be explained hereunder. A static characteristic curve to which a load line of FET T1 is added is shown in FIG. 7. When the motor is normally running before the jamming occurs, T1 operates at an A point. When the motor load current ID is changed, the operating point moves vertically between the A point and a B point, for example, in the ohmic range. When the jamming occurs, the load current ID of the motor is increased and the operating point of T1 moves upward. When the operating point comes up to the B point, T1 is turned OFF. A current difference between the B point and the A point shows the jamming sensing value. When T1 is turned OFF, the drain-source voltage VDS is extended but the operating point of T1 at that time moves rightward on a horizontal line passing through the B point. In other words, the drain current ID (=the motor load current) keeps as it is the value obtained when T1 is turned OFF and the drain-source voltage VDS of T1 is extended. This is because, when the drain-source voltage VDS of T1 moves between the ground potential level and the power supply voltage, the gate-drain capacitance CGD of T1 is apparently increased by the Miller effect and thus the drain-source voltage VDS is seldom changed.

Miller Effect

Figure 8:
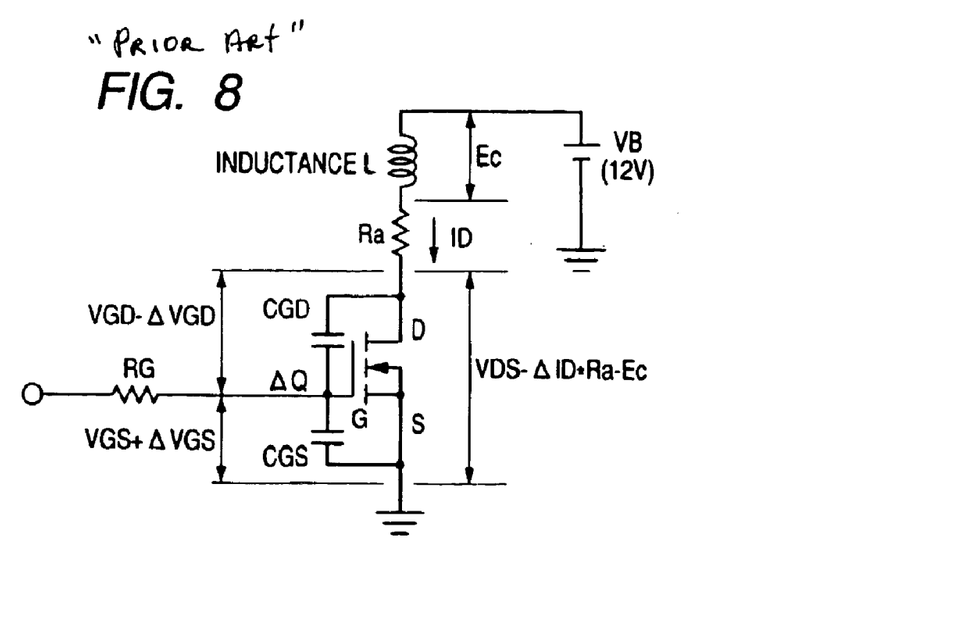
FIG. 8 is an equivalent circuit diagram explaining the operation of the semiconductor switching element in the current limiting circuit in the power-window jamming preventing apparatus in the related art.

FIG. 8 is an equivalent circuit diagram of the switching element T1. Suppose that the drain-source voltage VDS is increased by an infinitesimal voltage ΔVGS based on the charging executed via the gate driver. Accordingly, the motor current ID is increased by ΔID and thus a counter electromotive force Ec (=L*dID/dt) is generated by an inductance L of the motor. A charge ΔQ charged in the gate-drain capacitance CGD is given by Eq.(5).

$$\Delta Q = CGD*(\Delta VGS + \Delta ID*Ra + Ec) \quad \text{Eq.(5)}$$

where Ra is an armature resistance. Also, a capacitance Cm of CGD, which is from the gate terminal, is given by Eq.(6).

$$Cm = \Delta Q/\Delta VGS = CGD*(1 + \Delta ID*Ra/\Delta VGS + Ec/\Delta VGS) \quad \text{Eq.(6)}$$

The capacitance Cm is the "Miller capacitance" and is the apparent capacitance generated by the fact that a voltage change across the capacitance CGD is considerably larger than ΔVGS. When the gate driver charges/discharges the gate charge of FET via the gate resistance RG, the capacitance that can be seen from the driver side is not CGD but Cm. When the inductance L of the motor becomes large, the capacitance Cm has a large value rather than CGD and thus the gate-source voltage VGS is seldom changed even though the gate driver charges/discharges the gate of T1 in the ON/OFF operation. However, the Miller effect is effective only when the drain potential VDS of the main FET (T1) can be changed freely between the ground potential level (GND) and the power supply voltage (VB). At this time, since T1 is in the pinch-off range, ID=Gm*VGS is satisfied where Gm is a transfer conductance of T1. It is appreciated from this Equation that ID is not changed and is kept almost constant if VGS becomes almost constant.

Suppose that, when the transistor T32 is turned ON and OFF in FIG. 5, the voltage at the minus input terminal of the comparator CMP3 is given by VL and VH FIG. 7 respectively. In this circuit example, VL=3.03V and VH=8.82V are given. When the operating point of T1 moves rightward on a horizontal line passing through the B point in FIG. 7 and the drain voltage VDS exceeds the voltage VH, the output of CMP3 goes to the H level and T1 is turned ON. In the actual circuit, because of a delay in the circuit, T1 is turned ON after a while after the drain voltage VDS exceeds VH. In FIG. 7, T1 is turned ON at a C point at which the VDS exceeds 10V, and VDS goes down toward the ground potential level. When VDS is lowered smaller than the voltage VL, the output of CMP3 goes to the L level and T1 is turned OFF once again. In this manner, T1 continues the ON/OFF operation as far as the output of CMP2 is at the L level.

Reduction of ID by the ON/OFF Operation

Next, the event that the drain current ID is reduced gradually during when the ON/OFF operation is continued will be explained hereunder. Since the drain voltage VDS of T1 is restricted by the reference voltages VL and VH when the ON/OFF operation is started, the operating point of T1 oscillates between the C point and the D point in FIG. 7. The average value of VDS at this time is at a G point and is located substantially in the center between the C point and the D point. The G point is the DC-like operation point of T1. In contrast, a line segment CD gives an AC operating curve. In FIG. 7, a straight line a gives a load line of T1 when the motor is stopped in the case where the power supply device VB is set to 12.5V, and a gradient is decided by the armature resistance Ra. Straight lines b to g are in parallel with the straight line a, and their projections onto the axis of abscissa can represent an amount of the voltage drop respectively when the drain current ID (=the motor current) is supplied to the motor.

First, the situation immediately before the jamming occurs will be considered herein. The operation point of T1 at this time exists in the A point. Assume that the counter electromotive force of the motor is Emotor-A and the drain-source voltage is VDSon, Eq.(7) is given as follows.

$$VB = VDSon + Ra*ID + E\text{motor-}A \quad \text{Eq.(7)}$$

Next, the situation immediately after the jamming occurs and then the ON/OFF operation is started will be considered herein. ID consists of an AC component IDA that varies in synchronism with the ON/OFF operation, and a DC-like component IDD other than this IDA. That is, ID has a relationship ID=IDA+IDD. A counter electromotive force Eonoff is generated by the inductance of the motor when IDD is changed. A magnitude of the force is calculated by Eq.(8).

$$E\text{onoff} = L*d(IDD)/dt \quad \text{Eq.(8)}$$

Assume that an average value of the drain-source voltage VDS of T1 in the ON/OFF operation is VDSonoff. This corresponds to the G point in FIG. 7. Suppose that the number of revolution of the motor is not changed in one period of the ON/OFF operation. In addition, since ID is not changed, Eq.(9) is given.

$$VB = VDSonoff + Ra*ID + E\text{motor-}A + E\text{onoff} \quad \text{Eq.(9)}$$

Subtracting both sides in Eq.(9) from both sides in Eq.(7) respectively gives Eq.(10).

$$0 = VDSon - VDSonoff - E\text{onoff}$$

$$E\text{onoff} = VDSon - VDSonoff \quad \text{Eq.(10)}$$

where VDSon is a drain-source voltage in the continuous ON operation and is about 0.3 V, and VDSonoff is the voltage at the G point and is about 6.5 V. Thus, Eonoff has a minus value of −6.2V from Eq.(10). Then, it is seen that IDD is reduced smaller than that in Eq.(8) because Eonoff has the minus value.

Implementation of the Minimum Reversing Load (Prevention of the Malfunction Caused Due to the Rough Road, or the Like)

When the DC-like component of the ID goes down from the operating point G to the operating point H while executing the ON/OFF operation, the Iref-f is reduced to follow IDD. Then, when IDD reaches the H point in FIG. 7, the CMP2 is inverted from the L level to the H level, the operating point of FET T1 moves from the H point to the F point, and T1 enters into its continuous ON state. When T1 is brought into its continuous ON state, ID is increased, the operating point goes to the B point via the A point, and T1 enters into its ON/OFF operation once again. Since Iref-s is not changed for this while, the voltage at the plus input terminal of CMP2 is not changed and thus the A point is fixed and the B to F points are not changed correspondingly. The value of the current ID is restricted within a predetermined range during when the ON/OFF operation and the continuous ON state are repeated.

The average value of the current ID that is restricted within the predetermined range is maintained at the value that is slightly larger than the value of the current ID immediately before the current limiting operation is executed. This condition has two important meanings.

First, a motor torque can be limited within a predetermined range since the motor torque is in proportion to the current. Thus, the jamming load can be limited.

Second, the malfunction such that the motor is reversed although the jamming does not occur during the running on the rough road, or the like can be prevented. When the power window is operated during the running on the rough road, or the like, it is possible that the driving force of the window glass is changed by the vertical motion of the car body and such driving force is increased momentarily, the number of revolution of the motor is lowered correspondingly, ID is increased, T1 is turned OFF, and the current limiting mode is applied. However, since the preceding glass driving force is still maintained even though the current limiting mode is applied, the number of revolution of the motor can be restored into the original state when the increase of the load due to the vertical motion is eliminated, so that the false reversion can be avoided. In this case, the premise that the glass driving force is not changed for this while is needed. Also, this premise can be satisfied in most cases. According to above features, the minimum reversing load can be implemented under the condition that the false reversion is not caused by the momentary increase of the driving force caused due to the rough road, or the like.

Changes in the ON/OFF Operation Period and the Continuous ON Period According to the Reduction in the Number of Revolution of the Motor Next, the case where Eq.(7) and Eq.(9) are generalized will be considered herein. The number of revolution of the motor is lowered when a time lapsed for a while after the jamming occurs. Since the counter electromotive force of the motor is proportional to the number of revolution of the motor, a relationship of Emotor-B<Emotor-A is given if the counter electromotive force of the motor at that time is assumed as Emotor-B shown in FIG. 7. If T1 is brought into the continuous ON state by the counter electromotive force having this lowered number of revolution, i.e., an magnitude of Emotor-B, the increasing rate of the current ID is accelerated unlike the previous state, and thus a counter electromotive force Eon is generated by the inductance L of the motor. Thus, Eon=L*dID/dt is derived. Rewriting Eq.(7) by using Eon, which is not given in Eq.(7), gives Eq.(11).

$$VB = VDSon + Ra*ID + Emotor\text{-}B + Eon \qquad \text{Eq.(11)}$$

Suppose that the number of revolution of the motor in Equation of the ON/OFF operation corresponding to Eq.(11) is not changed in both the continuous ON operation and the ON/OFF operation, replacing the Emotor-A in Eq.(9) with the Emotor-B gives Eq.(12).

$$VB = VDSonoff + Ra*ID + Emotor\text{-}B + Eonoff \qquad \text{Eq.(12)}$$

Eq.(13) is derived from Eq.(11) and Eq.(12).

$$Eon - Eonoff = VDSonoff - VDSon = 6.5V - 0.3V = 6.2V \qquad \text{Eq.(13)}$$

Because a sign of Eon is plus and a sign of Eonoff is minus, Eq.(13) signifies that the counter electromotive force Eonoff in the continuous ON operation and the counter electromotive force Eonoff in the ON/OFF operation have an opposite sign respectively and a sum of their absolute values becomes constant and is equal to a difference between respective VDSs, i.e., VDSonoff−VDSon. A difference between VDSs is constant regardless of the number of revolution of the motor. Since Emotor-B becomes small as the number of revolution of the motor is lowered, an absolute value of Eonoff becomes small and an absolute value of Eon becomes large. That is, it is understood that, when the number of revolution of the motor is lowered, the decreasing rate of ID in the ON/OFF operation is lowered and the increasing rate of ID in the continuous ON operation is accelerated.

In addition, as can be seen from FIG. 7, Eonoff obtained when the operation goes out of the ON/OFF operation (H point) (Eonoff-C in FIG. 7) becomes small rather than Eonoff obtained immediately after the operation enters into the ON/OFF operation (G point) (Eonoff-D in FIG. 7). This indicates that a decreasing rate of the current is reduced gradually during the ON/OFF operation period. Also, the state that Eon-E is smaller than Eon-F in FIG. 7 indicates that an increasing rate of the current is reduced gradually during the continuous ON operation period.

Period of the ON/OFF Operation

When T1 is turned ON, the gate charge of T1 is discharged via R32 and the gate-source voltage of T1 starts to reduce. Then, ID starts to reduce because ID=Gm*VGS. The counter electromotive force Ec is generated by the inductance L of the motor owing to the reduction of ID, and the voltage drop due to the armature resistance Ra is reduced though it is small. That is, the voltage drop of the motor is reduced by an amount of drop ΔVM (=Ec+Ra*ΔID). Where ΔID denotes an amount of reduction of ID. Also, the counter electromotive force Ec can be calculated by Ec=L*ΔID/Δt. In this case, it is assumed that the number of revolution of the motor is not changed during one period of the ON/OFF operation.

The drain voltage VDS of T1 (which is equal to the drain-source voltage because the source is grounded) starts to increase because of an amount of drop ΔVM of the voltage drop of the motor. The gate-drain voltage of T1 is extended by ΔVM and the gate-drain capacitance CGD is charged by ΔVM. Since the charge is supplied to the gate by this charging, the gate charge is not reduced even though the charge is discharged via R32. Therefore, the gate-source voltage VGS is substantially scarcely reduced. This is the Miller effect.

Then, VDS is increased if the discharging still continues via R32, and then T1 is turned OFF when VDS exceeds the reference voltage VH. Then, the current flows into the gate of T1 from the power supply voltage VB via the resistors R31 and R32 and thus the gate starts to be charged. When the gate-source voltage VGS starts to increase owing to the charging of the gate, ID increases and the gate charge is absorbed by the Miller effect, as in the case of the discharging of the gate charge. That is, the charges charged via R31 and R32 are canceled by the Miller effect. Then, VDS is lowered when the charging of the gate proceeds, then the output of CMP3 goes to the L level when VDS becomes smaller than the reference voltage VL, and then T1 is brought into its OFF state.

A quantity of charge being supplied/canceled to/from the gate of T1 by the Miller effect is decided by the reference voltages VL and VH, and has a constant amount. A time required by the gate circuit to charge and subsequently discharge this quantity of charge gives one period of the ON/OFF operation. A charging time of the gate is decided by the power supply voltage VB and the gate resistances R31+R32, and a discharging time is decided by the gate resistance R32. That is, the period of the ON/OFF operation is decided by the reference voltages VL and VH, the power supply voltage VB, and the gate resistances R31 and R32. Therefore, the period of the ON/OFF operation can be varied by changing the gate resistances, more particularly the resistance R32.

3. Explanation of the Jamming Determining Circuit 6

3-1. Circuit Configuration of the Jamming Determining Circuit 6

The jamming determining circuit 6 in FIG. 5 has an input terminal that is connected to the output terminal of CMP3 in the current limiting circuit 7, and can be composed of a 16 pulse counter that is reset if it does not count for 80 μsecond.

3-2. Explanation of the Operation of the Jamming Determining Circuit 6

The power-window jamming preventing apparatus senses the jamming by the current sensing circuit 2, then limits the current by the current limiting circuit 7 to keep the motor current ID within the predetermined range, and then determines by the jamming determining circuit 6 whether or not the jamming occurs. A determining method will be explained herein. When the number of revolution of the motor is lowered by the jamming, the ON/OFF operation period of T1 is prolonged while the continuous ON operation period of T1 is shortened. It is determined by utilizing this characteristic whether or not the jamming occurs. There are three following methods as the particular determining method.

(a) The occurrence of the jamming is determined when a ratio of the continuous ON operation period and the ON/OFF operation period reaches a predetermined value while sensing the ratio. The continuous ON operation period and the ON/OFF operation period can be discriminated based on the output of CMP2. The operation is the continuous ON operation when the output of CMP2 is at the H level, and the operation is the ON/OFF operation when the output of CMP2 is at the L level. Therefore, a target ratio can be sensed if the output of CMP2 is averaged as the analog signal.

(b) The occurrence of the jamming is determined when the continuous ON operation period or the ON/OFF operation period reaches a predetermined value while counting the period. The determination is made by counting the H period or the L period of the output of CMP2.

(c) The occurrence of the jamming is determined when an ON/OFF frequency in the ON/OFF operation period reaches a predetermined value while counting the frequency. The leading frequency of the output level of CMP3 is counted, as shown in FIG. 5, and then the occurrence of the jamming is determined when the counted frequency reaches 16 pulses in the example in FIG. 5. In order not to count the frequency in the continuous ON operation period, the counter is reset when the pulse is interrupted for a predetermined period. In the example in FIG. 5, the counter is reset when the output of CMP3 is not changed for 80 μs. The number of revolution when the occurrence of the jamming is determined is set to a state in which such number of revolution is lowered by about 60% rather than the number of revolution prior to the occurrence of the jamming. This set value is at a level that is not generated by reduction in the number of revolution caused by the impulsive load change that is generated due to the rough road, or the like.

Method of Setting a Jamming Determining Value

A method of setting a jamming determining value is summed up as follows.

(i) A determining value is set at a level that is not generated by reduction in the number of revolution of the motor caused by the impulsive load change that is generated due to the rough road, or the like.

(ii) A continued period of the ON/OFF operation depends on the OFF delay time of T1 and the response characteristic of the OP amplifier used as CMP1. Therefore, the ON/OFF frequency corresponding to the determining value is decided based on standard values of these characteristics as the premise, and then a counter value is set.

(iii) When the determining value must be adjusted because the OFF delay time of T1 and the response characteristic of the OP amplifier are varied, the ON/OFF operation period is changed by varying the gate series resistance of T1 to deal with these variations. Accordingly, the counter value can be fixed even though the OFF delay time of T1 and the response characteristic of the OP amplifier are varied. It is convenient for the case where respective circuits are prepared as IC that the counter value can be fixed.

Change in the Number of Revolution of the Motor in the ON/OFF Operation

Explanation is made of the situation that the ON/OFF operation period is extended but the continuous ON operation period is shortened when the number of revolution of the motor is lowered. This explanation is made based on the assumption. That is, the assumption that the number of revolution of the motor is seldom changed in one period of the ON/OFF operation is made. This assumption is realized by such a method that the motor continues to push the glass with a constant force during the ON/OFF operation. Since the inter-terminal voltage of the motor is given as VB-VDSonoff in the ON/OFF operation, a motor output Pm is given by Eq.(14).

$$\begin{aligned}Pm &= (VB - VDSonoff) * ID - Ra * ID2 \\ &= (VB - VDSonoff - Ra * ID) * ID \\ &= (Emotor - Eonoff) * ID\end{aligned} \qquad \text{Eq. (14)}$$

Followings can be understood by Eq.(14).

(i) In the ON/OFF operation, the almost constant output is output irrespective of the number of revolution of the motor.

(ii) In the ON/OFF operation, the output is lowered by VDSonoff*ID rather than the output in the continuous ON operation.

In other words, the motor outputs the constant output during the ON/OFF operation to drive the window glass. This means the motor continues to push the window glass, and the number of revolution of the motor is always linked with the speed of the window glass. Since the motion of the window glass is slow, such motion is seldom changed within one period of the ON/OFF operation. As a result, the number of revolution of the motor is also seldom changed within one period of the ON/OFF operation, so that the above assumption can be supported.

According to the above power-window jamming preventing apparatus and other embodiments and variations disclosed in JP-A-2002-395129, the motor current can be limited by determining quickly the jamming of the foreign matter without error. However, it is further preferable that the performance of sensing the jamming of a relatively soft foreign matter should be improved in a state that the heavy load is always applied to the window glass because the friction is increased particularly by the low temperature, the aged deterioration, and so on.

SUMMARY OF THE INVENTION

The present invention has been made in light of the above circumstances, and it is an object of the present invention to provide an improved power-window jamming preventing apparatus capable of limiting a motor current by sensing surely an abnormal current caused in a motor current due to a jamming of a foreign matter without error in the power-window jamming preventing apparatus that can sense the jamming of the foreign matter in a window glass based on change in the motor current.

In order to achieve the above object, according to the present invention, there is provided a power-window jamming preventing apparatus, comprising:

a current sensing circuit, which senses a motor current flowing through a motor for driving a window glass;

a current limiting circuit, which increases and decreases the motor current within a predetermined range based on a current-limitation control signal outputted from the current sensing circuit when an amount of increase of the motor current exceeds a predetermined vale; and a jamming determining circuit, which determines a jamming of a foreign matter in the window glass based on increase of the motor current to reverse a rotation of the motor, wherein the current sensing circuit includes;

a shunt resistor, on which the motor current is flown;

a reference resistor, which has a resistance value that is n times the shunt resistor; and a current following circuit, which increases and decreases a reference current that flows through the reference resistor and is 1/n of the motor current, based on a voltage applied to the shunt resistor;

wherein the current following circuit includes:

a reference current controlling circuit, which controls increase/decrease of the reference current, and generates a first reference voltage, which is lowered according to increase of the motor current, and a second reference voltage, which is higher than the first reference voltage, based on the reference current;

a first comparator, which has a first input terminal to which the first reference voltage is applied; and a charging/discharging circuit, which generates a third reference voltage in compliance with a charge/discharge controlling signal outputted from the first comparator and outputs the third reference voltage to a second input terminal of the first comparator, the third reference voltage indicating an average value of the first reference voltage, and the charge/discharge controlling signal being shifted alternately to two voltage levels, the apparatus, further comprising a charge/discharge controlling circuit which monitors a voltage level of the charge/discharge controlling signal, and controls the charging/discharging circuit to keep the third reference voltage constant when the charge/discharge controlling signal having one of the voltage levels is continuously outputted for a predetermined time.

According to the above configuration, the charge/discharge controlling circuit monitors constantly a voltage level of the charge/discharge controlling signal being output from the first comparator, and controls the charging/discharging circuit to keep the third reference voltage constant when one voltage level of the charge/discharge controlling signal is continued for a predetermined time. Therefore, in contrast to the power-window jamming preventing apparatus in the related art, when an amount of increase of the motor current is in excess of a predetermined value, the power window motor can be reversed without fail by causing the current limiting circuit to reduce the motor current more surely within a predetermined range and also causing the jamming determining circuit to determine the occurrence of the jamming based on the increase of the motor current without error before the power window motor is stopped by the jamming of the foreign matter. As a result, the performance of sensing the jamming of the relatively soft foreign matter can be improved in a state that the heavy load is always applied to the window glass because the friction is increased particularly by the low temperature, the aged deterioration, and so on. In addition, the performance of sensing the jamming of the relatively soft foreign matter can also be improved in a state that the output voltage of the power supply device gives a low voltage.

Preferably, the current sensing circuit includes a second comparator having a first input terminal to which the second reference voltage is applied, a second input terminal to which the third reference voltage is applied, and an output terminal from which the current-limitation control signal is outputted. The second comparator outputs the current-limitation control signal to the current limiting circuit to reduce the motor current when the motor current is increased due to occurrence of the jamming and the second reference voltage is lowered below the third reference voltage that is kept constant by the charging/discharging circuit.

According to the above configuration, when the motor current is increased due to occurrence of the jamming and the second reference voltage is lowered below a value of the third reference voltage that is kept constant by the charging/discharging circuit, the second comparator outputs the current-limitation control signal to the current limiting circuit to reduce the motor current within a predetermined range. Therefore, the load applied to the foreign matter can be lowered quickly without fail.

Preferably, the apparatus further comprising a power supply device, which supplies the motor current to the motor and supplies the reference current to the current sensing circuit and has a ground terminal to which respective one ends of the shunt resistor and the reference resistor are connected, and respective other ends of the shunt resistor and the reference resistor are connected to the current following circuit. The charging/discharging circuit includes: a capacitor, which is connected between the second input terminal of the first comparator and a plus terminal of the power supply device to generate the third reference voltage by charging/discharging; a first current source, which is connected in parallel with the capacitor to charge the capacitor; a second current source, which is connected to the ground terminal of the power supply device to discharge the capacitor; and a semiconductor switch, which is provided between the second current source and the first current source, and performs an ON/OFF operation in compliance with an output of the first comparator to cause the first current source to charge the capacitor and cause the second current source to discharge the capacitor. When the motor current is increased due to occurrence of the jamming and the one of the voltage levels of the charge/discharge controlling signal is continued for the predetermined time, the charge/discharge controlling circuit controls the first current source and the second current source so that charging/discharging of the capacitor is prohibited to keep a value of the third reference voltage constant irrespective of the ON/OFF operation of the semiconductor switch to thereby cause the second reference voltage to lower below the value of the third reference voltage.

According to such configuration, the reduction in the third reference voltage can be prevented.

With the above, the present invention is explained in brief. In addition, details of the present invention will be further clarified by reading through the best mode applied to implement the invention explained hereinafter with reference to the accompanying drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
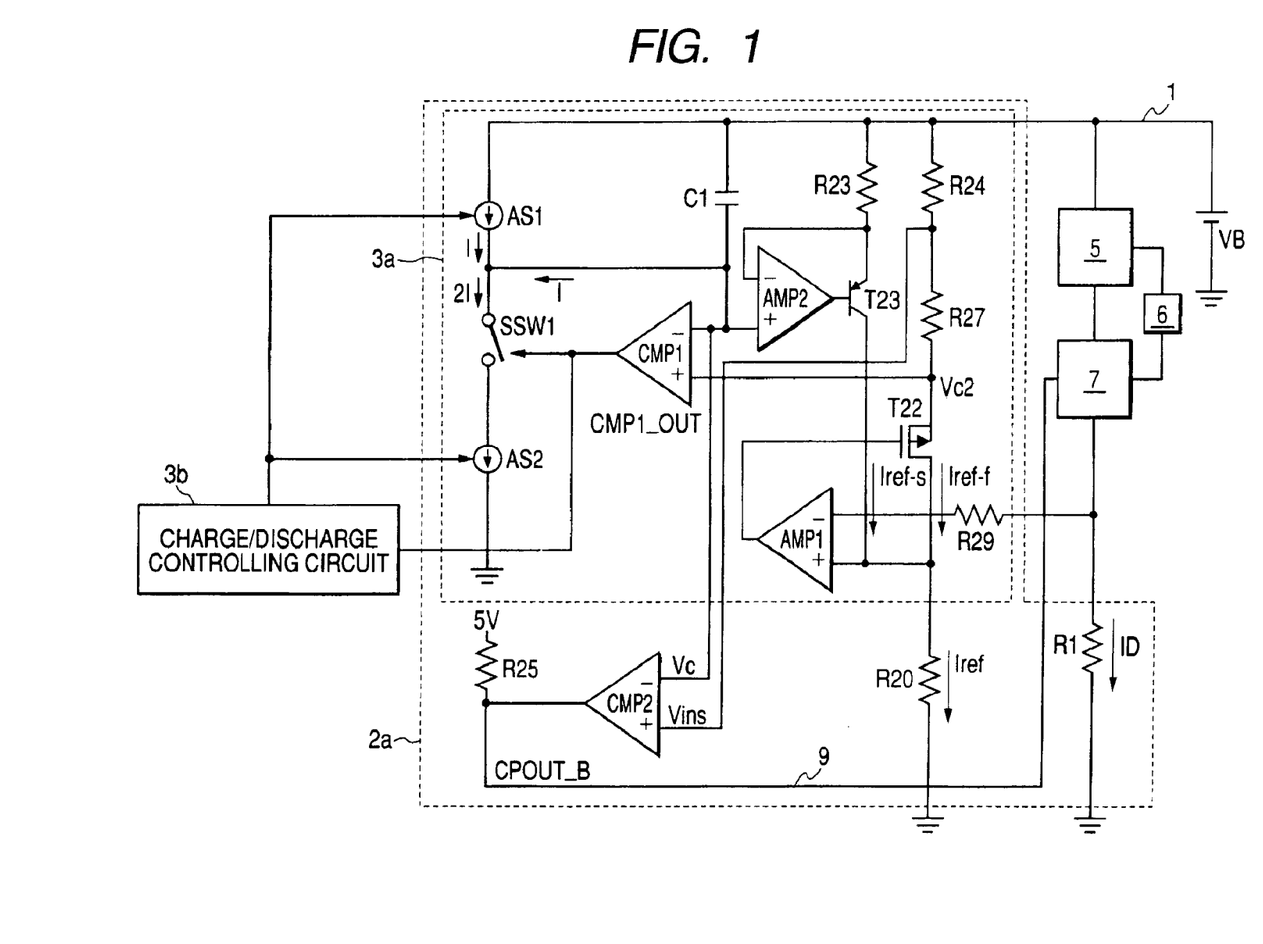
FIG. 1 is a circuit diagram showing schematically a power-window jamming preventing apparatus as an embodiment according to the present invention.
Figure 2:
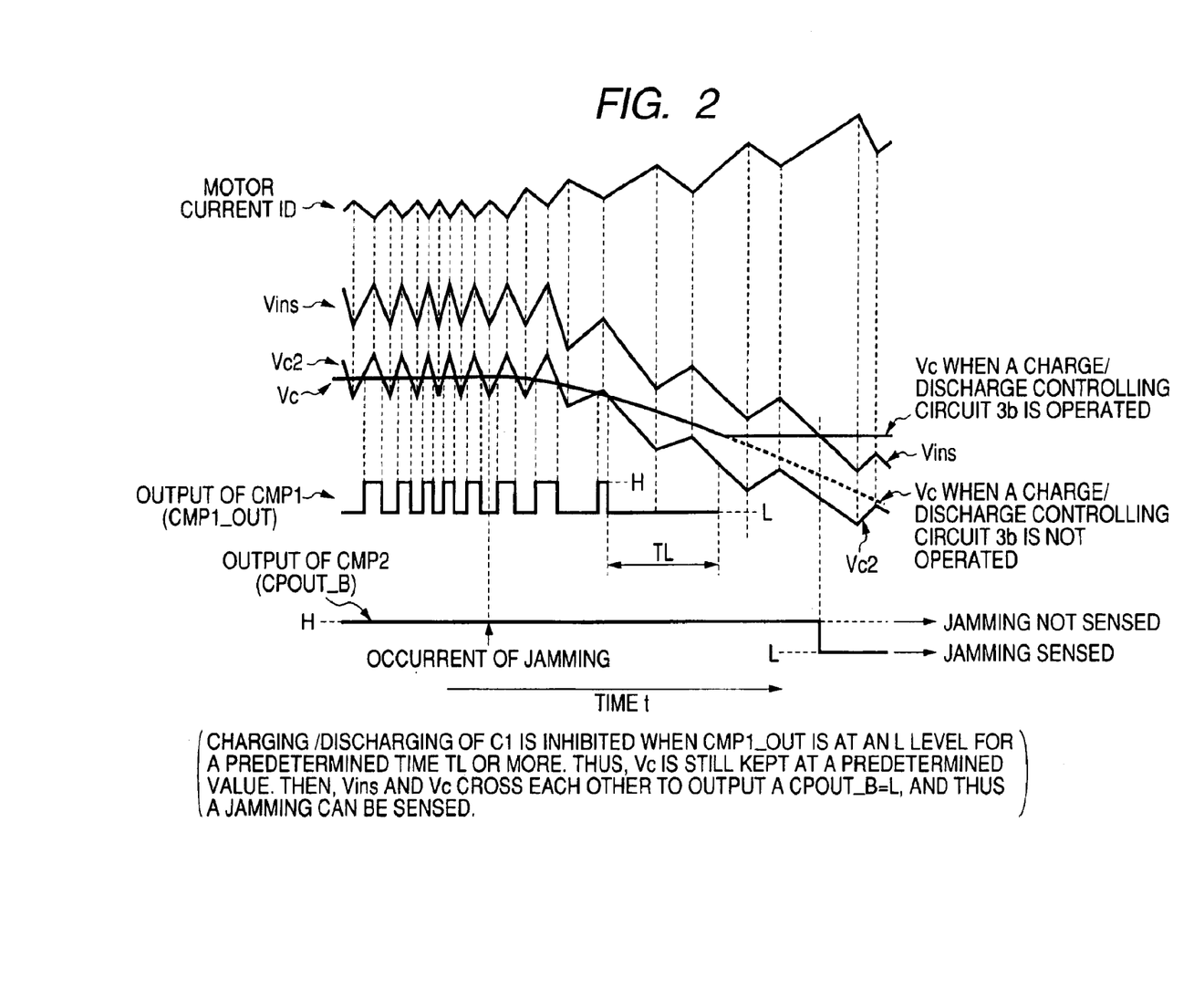
FIG. 2 is a characteristic view for comparing the case where a charge/discharge controlling circuit is not operated with the case where the charge/discharge controlling circuit is operated, in the power-window jamming preventing apparatus in FIG. 1.

Preferred embodiments according to the present invention will be explained in detail with reference to the accompanying drawings hereinafter. FIG. 1 is a circuit diagram showing schematically a power-window jamming preventing apparatus according to an embodiment of the present invention. FIG. 2 is a characteristic view showing relationships between the motor current ID, a first reference voltage Vc2, a second reference voltage Vins, a third reference voltage Vc, an output (CMP1_OUT) of the comparator CMP1, and an output (CPOUT_B) of the comparator CMP2 in the cases where a charge/discharge controlling circuit is not operated and is operated, in the power-window jamming preventing apparatus in FIG. 1.

The power-window jamming preventing apparatus of the present invention shown in FIG. 1 includes the circuit in which the power-window jamming preventing apparatus in FIG. 5 is varied like FIG. 4C, as already explained, and the current sensing circuit 2 is varied by using a resistor instead of the diode D21. More concretely, in the power-window jamming preventing apparatus of the present invention, the shunt resistor R1 and the reference resistor R20 of the current sensing circuit 2 are arranged on the low side (i.e., the ground side) of the power window motor 5, and a circuit configuration of the current following circuit 3 in the current sensing circuit 2 is varied correspondingly, and a charge/discharge controlling circuit 3b is further added to the circuit configuration.

As shown in FIG. 1, the power-window jamming preventing apparatus of the present invention includes a current sensing circuit 2a for sensing increase of the motor current ID that passes through the power window motor 5 having the forwarding/reversing circuit, the current limiting circuit 7 for decreasing and increasing the motor current ID within a predetermined range in compliance with a current-limitation controlling signal CPOUT_B output from the current sensing circuit 2a when an amount of increase of the motor current ID exceeds a predetermined value, and the jamming determining circuit 6 connected to the current limiting circuit 7 and the power window motor 5, for determining the occurrence of the jamming based on the increase of the motor current ID to reverse the power window motor 5. In this case, configurations of the power window motor 5, the jamming determining circuit 6, and the current limiting circuit 7 are substantially identical to those in the circuit configuration of the power-window jamming preventing apparatus in FIG. 5.

The current sensing circuit 2a has the shunt resistor R1, the reference resistor R20, a current following circuit 3a, the comparator (second comparator) CMP2, and the resistor R25. The shunt resistor R1 is connected in series with the power window motor 5 and the current limiting circuit 7. One end of the shunt resistor R1 is connected to the minus terminal (i.e., the ground terminal) of the power supply device VB to pass the motor current ID from the power supply device VB. The reference resistor R20 has a resistance value that is n times the shunt resistor R1. One end of the reference resistor R20 is connected to the minus terminal of the power supply device VB. The current following circuit 3a is connected to the other ends of the reference resistor R20 and the shunt resistor R1 respectively, for increasing/decreasing the reference current Iref supplied to the reference resistor R20 based on the voltage applied to the shunt resistor R1. Plus input terminal and minus input terminal of the comparator CMP2 are connected to the current following circuit 3a. An output terminal of the comparator CMP2 is connected to NOR1 (see FIG. 5) in the current limiting circuit 7. The resistor R25 is connected between the 5V power supply and the output terminal of CMP2, for pulling up the current-limitation control signal CPOUT_B.

The current following circuit 3a has a reference current controlling circuit that controls increase/decrease of the reference current that is 1/n of the motor current ID. The reference current controlling circuit has the resistor R24 whose one end is connected to the electric wire 1, a resistor R27 whose one end is connected to the other end of the resistor R24 and to this one end of which the plus input terminal of CMP2 is connected, the FET T22 provided between the resistor R27 and the reference resistor R20 such that its drain terminal is connected to the other end of the resistor R27 and its source terminal is connected to the other end of the reference resistor R20, an OP amplifier AMP1 whose plus input terminal is connected to a source terminal of T22 and whose output terminal is connected to a gate terminal of T22, a resistor R29 whose one end is connected to a minus input terminal of the OP amplifier AMP1 and whose other end is connected to the other end of the shunt resistor R1, the resistor R23 whose one end is connected to the electric wire 1, a PNP bipolar transistor T23 whose emitter terminal is connected to the other end of the resistor R23 and whose collector terminal is connected to a source terminal of T22, and an OP amplifier AMP2 whose minus input terminal is connected to an emitter terminal of T23, whose output terminal is connected to a base terminal of T23, and whose plus input terminal is connected to a minus input terminal of CMP2.

The OP amplifier AMP1 applies an appropriate voltage to the gate terminal of T22 to control T22 such that the current Iref-f is supplied from T22 to the reference resistor R20 in response to increase/decrease of the motor current ID that flows through the shunt resistor R1. In this control, the voltage applied from AMP1 to the gate terminal of T22 is increased to increase a flow of the current Iref-f since the voltage at the input terminal of AMP1 is increased in an instant when the motor current ID is increased, while the voltage applied from AMP1 to the gate terminal of T22 is decreased to reduce the flow of the current Iref-f since the voltage at the input terminal of AMP1 is decreased in an instant when the motor current ID is decreased conversely. In this case, although the resistor R29 is provided between the minus input terminal of AMP1 and the shunt resistor R1, this resistor R29 may not be provided because this resistor R29 is an input impedance adjusting resistor for AMP1. Unless the resistor R29 is provided, the reference current Iref must be supplied to the reference resistor R20 in such a manner that voltages applied to the shunt resistor R1 and the reference resistor R20 respectively always become equal mutually.

The current following circuit 3a further has the comparator (first comparator) CMP1 whose minus input terminal is connected to the plus input terminal of the OP amplifier AMP2 and whose input terminal is connected to a drain terminal (i.e., the other end of the resistor R27) of T22, and a charging/discharging circuit. This charging/discharging circuit has the capacitor C1 whose one end is connected to the electric wire 1 and whose other end is connected to a minus input terminal of CMP1, a first current source AS1 connected in parallel with the capacitor C1 and whose input side terminal is connected to the electric wire 1, a semiconductor switch SSW1 connected to an output side terminal of the current source AS1 and ON/OFF-operated in accordance with the output of CMP1, and a second current source AS2 whose input side terminal is connected to the semiconductor switch SSW1 and whose output side terminal is connected to the minus terminal of the power supply device VB.

In the current following circuit 3a, the first reference voltage Vc2 as a potential of the drain terminal (i.e., the other end of the resistor R27) of T22 is applied to the plus input terminal of the comparator CMP1. Also, the second reference voltage Vins applied to the plus input terminal of CMP2 shows a voltage value that is higher than Vc2 by the resistor R27. Also, the third reference voltage Vc is generated by charging/discharging the capacitor C1 while being controlled to give an average value of Vc2, and is applied to the minus input terminal of CMP1 and the minus input terminal of CMP2. The voltages Vc2, Vins, and Vc are generated by passing the reference current Iref through the reference current controlling circuit, and a difference between Vc and Vc2 is proportional to a difference between Vc and Vins.

Since a current value of the current Iref-s is derived by dividing a voltage applied across the resistor R23 (i.e., difference voltage between the potential of the electric wire 1 and Vc) by a resistance value of R23, the OP amplifier AMP2 applies an appropriate voltage to the base terminal of T23 from the output terminal of AMP2 to control T23 such that the current Iref-s flows through the resistor R23. In this control, the voltage applied to the base terminal of T23 from AMP2 is decreased slowly to thus flow a large amount of current Iref-s since the voltage (Vc) at the input terminal of AMP2 is lowered with delay mainly because of the charging/discharging of the capacitor C1 when the motor current ID is increased, while the voltage applied to the base terminal of T23 from AMP2 is increased slowly to thus reduce the current Iref-s since the voltage (Vc) at the input terminal of AMP2 is enhanced with delay mainly because of the charging/discharging of the capacitor C1 when the motor current ID is decreased.

In this event, the reference current Iref flowing through the reference resistor R20 is given by a total sum of the current Iref-f flowing through the resistor R24 and the resistor R27 and the current Iref-s flowing through the resistor R23, and is a current that corresponds to a fraction of several thousands to several tens of thousands of the motor current ID, like the case of the circuit configuration in FIG. 5, and is rippled similarly to the motor current ID. The potential Vins shows the potential between the resistor R24 and the resistor R27, and the potential dropped from Vins by a certain value by using the resistor R27 is Vc2. Thus, Vc2 is rippled in the same way as Vins. In this case, it is needless to say that ripple waveforms of Vins and Vc2 are inverted with respect to the ripple waveform of the motor current ID.

Then, CMP1 outputs a charge/discharge control signal CMP1_OUT at the H level when Vc2 becomes Vc or more, and outputs the charge/discharge control signal CMP1_OUT at the L level when Vc2 becomes Vc or less. In this manner, CMP1 outputs the charge/discharge control signal CMP1_OUT that is shifted alternately between two voltage levels of the H level and the L level. When the semiconductor switch SSW1 receives CMP1_OUT at the H level from CMP1, the circuit is opened and the capacitor C1 is charged by the current I supplied from the first current source AS1. In contrast, when the semiconductor switch SSW1 receives CMP1_OUT at the L level from CMP1, the circuit is shorted and the current 2I that is twice the current I is supplied from the second current source AS1 to the ground. Thus, the current I flows from the first current source AS1 to the second current source AS2, and also the current I flows from the capacitor C1 to the second current source AS2 to discharge the capacitor C1. In this way, the stabilized reference voltage Vc is generated by the charging/discharging circuit and is controlled to follow Vins.

In the power-window jamming preventing apparatus shown in FIG. 1, when the motor current Id is increased sharply by the occurrence of the jamming, the voltage at the plus input terminal of CMP2 (Vins) indicating an instantaneous value of the motor current ID and the voltage at the minus input terminal of CMP2 (Vc) generated by the charging/discharging of the capacitor C1 cross each other (i.e., the potential of Vins is reduced below the potential of Vc). The output (CPOUT_B) of CMP2 is shifted from the H level to the L level during this crossing. Then, when CPOUT_B goes to the L level, the semiconductor switching element T1 (see FIG. 5) is ON/OFF-controlled in the current limiting circuit 7. Then, the jamming determining circuit 6 counts the ON/OFF frequency in the ON/OFF operation period based on the leading frequency of the output level of CMP3 (see FIG. 5) in the current limiting circuit 7, and then determined that the jamming occurred when the counted value comes up to a predetermined value (e.g., 16 pulses).

However, in a state that the heavy load is always applied to the window glass because the friction is increased particularly by the low temperature, the aged deterioration, and so on, or in a state that the output voltage of the power supply device VB is lowered, the motor current ID is always large even if the jamming does not occur. Thus, change in the motor current ID becomes gentle even though the motor current ID is increased by the occurrence of the jamming (in other words, changes in Vins and Vc2 become gentle even though the motor current ID is increased), and in addition the change in the motor current ID becomes gentle more and more if the jammed foreign matter consists of the relatively soft and not-hard matter. In the case where the charge/discharge controlling circuit 3b is not operated, for example, in such state of the motor current ID, Vins and Vc2 do not cross each other in the power-window jamming preventing apparatus in FIG. 1 in although the jamming occurs. As a result, the jamming may not be sensed because CPOUT_B is not shifted to the L level and still kept at the H level.

An operation of the power-window jamming preventing apparatus at that time (i.e., the operation taken when the charge/discharge controlling circuit 3b is not operated) is shown in FIG. 2 by using respective characteristic curves of the motor ID, the first reference voltage Vc2, the second reference voltage Vins, the third reference voltage Vc, the output (CMP1_OUT) of the comparator CMP1, and the output (CPOUT_B) of the comparator CMP2 (see broken-line portions as with the final transitions of the characteristic curves of the third reference voltage Vc and the CPOUT_B). As shown in FIG. 2, when the jamming does not occur, the motor current ID is in its stabilized state though it is much, Vc is kept to have a predetermined potential difference against Vins, and the output (CPOUT_B) of CMP2 at this time indicates the H level. Also, CMP1_OUT is shifted alternately between the H level and the L level, like the ripple of Vc2, every time where Vc2 and Vc cross each other. In contrast, when the jamming occurs, the potential of Vins is lowered according to the increase of the motor current ID, and the potential of Vc is lowered slowly to follow the reduction in the potential of Vins with delay. However, since the motor current ID is increased slowly and gentle, Vc can follow Vins because of the continuous charging/discharging operation of the capacitor C1. Thus, CMP1_OUT continues to have the L level, and Vins and Vc are shifted not to cross each other (i.e., the potential of Vins is maintained in a higher state than the potential of Vc). As a result, the output (CPOUT_B) of CMP2 is still kept at the H level and thus the jamming cannot be sensed.

For this reason, the charge/discharge controlling circuit 3b is provided to the power-window jamming preventing apparatus of the present invention, and the charge/discharge controlling circuit 3b is connected to the first current source AS1, the second current source AS2, and the output terminal of the first comparator CMP1. The charge/discharge controlling circuit 3b controls the current outputting operations of the first current source AS1 and the second current source AS2 by monitoring always the voltage level of the output signal of CMP1 (i.e., CMP1_OUT), and can prohibit and permit to output the current I used to charge the capacitor C1 and the current 2I used to discharge the capacitor C1. In more detail, when one voltage level (the L level in the present embodiment) out of two voltage levels of CMP1_OUT is continued for a predetermined time, the charge/discharge controlling circuit 3b prohibits current outputting operations of the first current source AS1 and the second current source AS2 to keep Vc constant regardless of the ON/Off operation of the semiconductor switch SSW1.

A timer circuit (not shown) is built in the charge/discharge controlling circuit 3b, and the timer circuit starts to count a time every time when CMP1_OUT takes one voltage level (the L level in the present embodiment). Then, when the time count by the timer circuit (not shown) reaches a predetermined set count value (i.e., CMP1_OUT remains at one voltage level (the L level in the present embodiment) and a continued time of the voltage level reaches the predetermined set time), the charge/discharge controlling circuit 3b executes the control to prohibit the charging/discharging of the capacitor C1. In this case, this time count is cleared (in other word, reset) every time when CMP1_OUT goes to the other voltage level (the H level in the present embodiment). Therefore, when CMP1_OUT goes to the other voltage level (the H level in the present embodiment) after the time count goes up to the predetermined set count value, the charge/discharge controlling circuit 3b executes the control to permit the charging/discharging of the capacitor C1.

More concretely, in the present embodiment, when the motor current ID is increased by the occurrence of the jamming and also CMP1_OUT at the L level is output from CMP1 continuously for a predetermined time, the charge/discharge controlling circuit 3b controls the first current source AS1 and the second current source AS2 (i.e., prohibits the current outputting operations) such that the charging/discharging of the capacitor C1 is prohibited (in other words, the charging/discharging operation of the capacitor C1 is not executed), and keeps the value of Vc constant and suppresses (prevents) the reduction of this Vc. In contrast, when CMP1_OUT is at the H level, the charge/discharge controlling circuit 3b controls the first current source AS1 and the second current source AS2 (i.e., permits the current outputting operations) such that the charging/discharging of the capacitor C1 is permitted (in other words, the charging/discharging operation of the capacitor C1 is executed).

FIG. 2 shows operations and advantages attained by the control of such charge/discharge controlling circuit 3b (see solid-line portions as with the final transitions of the characteristic curves of the third reference voltage Vc and the CPOUT_B). As shown in FIG. 2, when the jamming occurs, the potential of Vins is lowered as the motor current ID is increased, and then the potential of Vc is also lowered slowly to follow the reduction in the potential of Vins with delay. Then, CMP1_OUT goes to the L level when Vc2 is lowered to the potential at which Vc2 and Vc do not cross each other. When the charge/discharge controlling circuit 3b senses the fact that this L level state of CMP1_OUT continues for a predetermined time TL, such charge/discharge controlling circuit 3b controls the first current source AS1 and the second current source AS2 to keep the value of Vc and suppress (prevent) the reduction of this Vc. Then, Vins and Vc cross each other (i.e., the potential of Vins goes down below the potential of Vc), and the output of CMP2 is shifted from the H level to the L level so that the occurrence of the jamming is sensed.

In this case, the present invention is not limited to the foregoing embodiments and variation, improvement, etc. may be applied appropriately. In addition, mode, number, arrangement, etc. of respective constituent elements and numeral value, waveform, etc. in the above embodiments may arbitrarily selected if they can implement the present invention, and are not limited to the above embodiments.

What is claimed is:

1. A power-window jamming preventing apparatus, comprising;

a current sensing circuit, which senses a motor current flowing through a motor for driving a window glass;

a current limiting circuit, which increases and decreases the motor current within a predetermined range based on a current-limitation control signal outputted from the current sensing circuit when an amount of increase of the motor current exceeds a predetermined vale; and a jamming determining circuit, which determines a jamming of a foreign matter in the window glass based on increase of the motor current to reverse a rotation of the motor, wherein the current sensing circuit includes;

a shunt resistor, on which the motor current is flown;

a reference resistor, which has a resistance value that is n times the shunt resistor; and a current following circuit, which increases and decreases a reference current that flows through the reference resistor and is 1/n of the motor current, based on a voltage applied to the shunt resistor;

wherein the current following circuit includes:

a reference current controlling circuit, which controls increase/decrease of the reference current, and generates a first reference voltage, which is lowered according to increase of the motor current, and a second reference voltage, which is higher than the first reference voltage, based on the reference current;

a first comparator, which has a first input terminal to which the first reference voltage is applied; and a charging/discharging circuit, which generates a third reference voltage in compliance with a charge/discharge controlling signal outputted from the first comparator and outputs the third reference voltage to a second input terminal of the first comparator, the third reference voltage indicating an average value of the first reference voltage, and the charge/discharge controlling signal being shifted alternately to two voltage levels, the apparatus, further comprising a charge/discharge controlling circuit which monitors a voltage level of the charge/discharge controlling signal, and controls the charging/discharging circuit to keep the third reference voltage constant when the charge/discharge controlling signal having one of the voltage levels is continuously outputted for a predetermined time.

2. The apparatus as set forth in claim 1, wherein the current sensing circuit includes a second comparator having a first input terminal to which the second reference voltage is applied, a second input terminal to which the third reference voltage is applied, and an output terminal from which the current-limitation control signal is outputted; and wherein the second comparator outputs the current-limitation control signal to the current limiting circuit to reduce the motor current when the motor current is increased due to occurrence of the jamming and the second reference voltage is lowered below the third reference voltage that is kept constant by the charging/discharging circuit.

3. The apparatus as set forth in claim 1, further comprising a power supply device, which supplies the motor current to the motor and supplies the reference current to the current sensing circuit, the power supply device having a ground terminal to which respective one ends of the shunt resistor and the reference resistor are connected, and respective other ends of the shunt resistor and the reference resistor being connected to the current following circuit, wherein the charging/discharging circuit includes:

a capacitor, which is connected between the second input terminal of the first comparator and a plus terminal of the power supply device, and generates the third reference voltage by charging/discharging;

a first current source, which is connected in parallel with the capacitor to charge the capacitor;

a second current source, which is connected to the ground terminal of the power supply device to discharge the capacitor; and a semiconductor switch, which is provided between the second current source and the first current source, and performs an ON/OFF operation in compliance with an output of the first comparator to cause the first current source to charge the capacitor and cause the second current source to discharge the capacitor; and wherein when the motor current is increased due to occurrence of the jamming and the one of the voltage levels of the charge/discharge controlling signal is continued for the predetermined time, the charge/discharge controlling circuit controls the first current source and the second current source so that charging/discharging of the capacitor is prohibited to keep a value of the third reference voltage constant irrespective of the ON/OFF operation of the semiconductor switch to thereby cause the second reference voltage to lower below the value of the third reference voltage.

* * * * *